United States Patent Office 2,834,054
Patented May 13, 1958

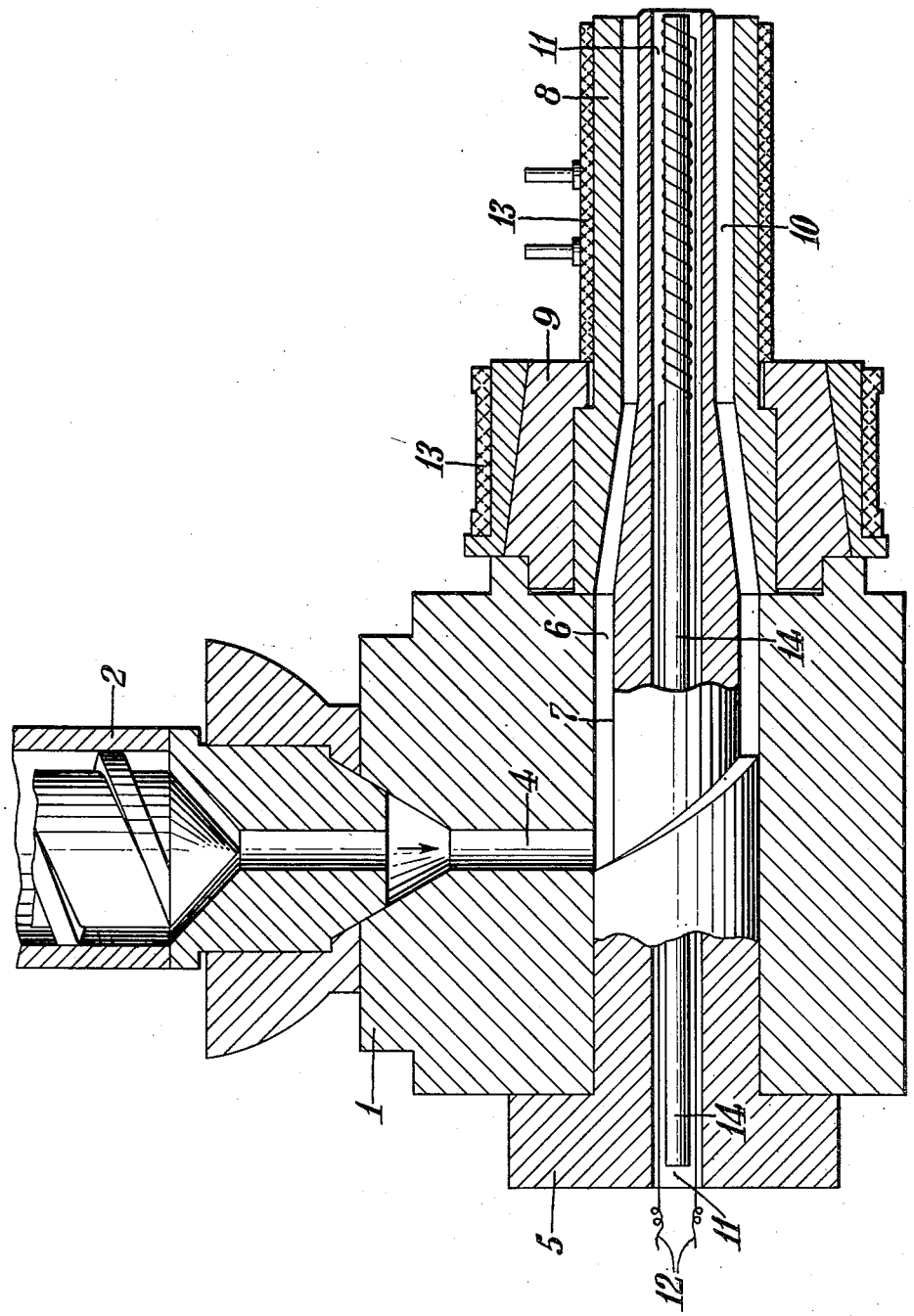

2,834,054

PROCESS FOR EXTRUDING POLYCHLORO-TRIFLUOROETHYLENE

Bruce H. Maddock, Fanwood, N. J., and William M. Land, Jr., Worcester, Mass., assignors to Union Carbide Corporation, a corporation of New York Application May 27, 1953, Serial No. 357,856

1 Claim. (Cl. 18—55)

This invention relates to a method of shaping polychlorotrifluoroethylene compositions by the extrusion thereof through a die to form elongated continuous shapes of uniform cross-section. More particularly, the invention relates to the extrusion of polychlorotrifluoroethylene compositions into hollow cylindrical forms and to an improved method for such extrusion which will insure the production of such forms having their inner and outer surfaces free from irregularities.

Chlorotrifluoroethylene polymers are normally termed "fluorothene polymers" and are prepared by the polymerization of monomeric chlorotrifluoroethylene. Such polymers may be produced in a range of molecular weights ranging from colorless low viscosity liquids, through waxes and greases to hard transparent thermoplastic resins having a softening point of approximately 208° C.

The high molecular weight resins to which the present invention is directed are graded either by melt viscosity at 230° C. as determined on a parallel plate plastometer, or by "No Strength Temperature," which is the point at which a notched specimen pulls apart under a small load at a fixed rate of temperature rise. Of particular importance are those fluorothene resins having a melt viscosity of from about 5 megapoises to about 100 megapoises at 230° C. which range is comparable to "No Strength Temperature" values varying from about 230° C. to about 320° C. These resins have been found to possess a high chemical stability with no adverse effect on the resins observed after exposure by contact to acids, lubricating oils, gasolines or various oxidizing compounds. Moreover, these resins are characterized by excellent resistance to water, cutting and flame resistance, good electrical insulation properties and the retention of such properties over a wide temperature range.

Fluorothene resins within the range referred to above are converted from their powdered state to plastic compositions at temperatures in the vicinity of 415° F. Such resins are known to undergo thermal degradation or decomposition, wherein the individual molecules are cracked or depolymerized, when subjected to temperatures above about 536° F. However, the rate of thermal degradation is extremely slow until the temperature has risen above about 560° F. As the temperature rises further, the rate of degradation rapidly increases and the desirable properties of the resin are lost unless the period of exposure is extremely brief.

In the extrusion of fluorothene resins into hollow cylindrical forms by the presently known methods, difficulty arises as the temperatures required to obtain a readily workable mass which may be forced through a forming section with the available pressure developed by the screw are such as cause thermal degradation. Briefly, these methods include the charging of the resin to the feed or rear-end of the cylinder section of a conventional extruder, wherein it is worked and fed along the cylinder by means of a screw, after which the resin is forced from the forward end of the cylinder through the crosshead and, subsequently, into a forming section comprising a die and guider pin. The resin is heated during the process by means of heaters positioned about the various sections of the extruder and by the frictional heat developed during the working of the resin. To obtain a workable product, the forward end of the cylinder, the crosshead and the die are usually heated to a temperature of from about 600° F. to about 640° F. At such temperatures, as indicated above, decomposition of the resin occurs.

The extent of thermal degradation or decomposition may be determined by a comparison of the melt viscosity of the resin before and after extrusion. It has been noted that regardless of the initial melt viscosity which may vary from about 5 megapoises to about 100 megapoises at 230° C., depending on the grade of resin employed, the extruded polymer usually has a melt viscosity in the range of from about 1 to about 2 and, occasionally, 3 megapoises at 230° C. As fluorothene products having a melt viscosity below two megapoises are generally unacceptable for use as an insulation for electrical conductors, the need for an improved method for the extrusion of fluorothene into hollow cylindrical forms, which will not cause excessive thermal degradation, exists.

Another problem encountered in the extrusion of fluorothene resins into hollow cylindrical forms is the difficulty of obtaining a product having smooth inner surfaces. In such methods, the temperatures of the die and guider pin are critical and must be maintained above certain minimum values to prevent sticking of the resin thereto. As indicated above, the die is heated by means of heaters and thus its temperature may be readily controlled. However, the guider pin is heated only by conduction from the crosshead and die, and the resin passing thereabout may sufficiently lower the temperature thereof to cause excessive adhesion. To maintain the guider pin at or above the minimum value, it is generally necessary to raise the crosshead and die temperatures, or raise the resin temperature, by increasing the cylinder temperature. In either instance, the resin is subjected to additional thermal abuse resulting in further polymer degradation.

This invention relates to an improvement in the presently employed methods for extruding thermoplastic materials comprising a chlorotrifluoroethylene polymer into hollow cylindrical forms. The improvement consists of the independent heating of the guider pin by separately controlling heating means so as to overcome the adhesion of the resin thereto. We have found that by such independent heating wherein the temperature of the guider pin is maintained at a value whereat adhesion is overcome, we not only obtain a product free of irregularities on its inner surfaces but that the amount of heat normally applied to the cylinder, crosshead and die to obtain a sufficiently workable mass which could be forced through the forming section may be materially decreased. Moreover, as the process of our invention requires less heat, there will result a lesser amount of thermal degradation of the polymers with consequent improvement of product properties.

In the practice of our invention, the guider pin will be heated at least to a temperature which will overcome adhesion of the fluorothene resin thereto and provide a hollow cylindrical product having smooth inner surfaces. The amount of heat employed will vary, depending on the land length of the die and guider pin, resin viscosity and the speed of extrusion.

The accompanying drawing comprises a cross-sectional view of an extruder wherein an embodiment of our invention is illustrated.

Referring to the drawing, I represents a crosshead secured to the discharge end of an extruder cylinder 2, and is provided with a passage 4. An opening extends transversely through the crosshead 1, and receives a guider pin 5. Fluorothene resin, as it is forced from the extruder cylinder, enters the crosshead through passage 4 and is fed to an annular passage 6 formed by the wall surface of the opening and the outer surface 7 of a portion of the guider pin. The guider pin 5 extends outwardly from the crosshead 1 and tapers inwardly over a portion of its length to a point whereat it remains constant in diameter. A die 8 heated by means of band heaters 13 is so positioned, by means of die holder 9, about that portion of the guider pin extending outwardly of the crosshead, as to cooperate with the guider pin to form an annular passage 10.

The apparatus thus far described merely comprises the conventional design for the extrusion of hollow cylindrical forms. When employed in the extrusion of fluorothene resins, the temperatures of the various sections must be closely controlled. Normally, the resin leaves the forward end of the extruder at a temperature of at least 600° F. The crosshead is usually maintained at a temperature of about 600° F. to about 640° F., while the die is usually maintained at a temperature of from 600° F., to 620° F. Under such conditions the guider pin temperature due to conduction will lie in the neighborhood of 600° F. to 620° F.

Referring again to the drawing in the embodiment of the invention disclosed, we provide an enlarged passage 11 throughout the length of the guider pin and insert therein heating means comprising a Nichrome wire heating coil 12. The coil is supported about a portion of Pyrex glass tubing 14, and, if desired, both the coil and tubing may be covered with Fiberglas insulating tape. The leads of the coil are connected to a low voltage transformer whose voltage can be varied to control the temperature. The guider pin will, therefore, be heated by means of conduction of heat from the crosshead and die and by means of the heat developed in the heater coil.

Our invention will be best illustrated by a comparison of the processing temperatures required to prepare fluorothene tubing by the heretofore employed methods and by our new method. Employing an apparatus of the type disclosed in the drawing, fluorothene tubing was extruded without heating the guider pin. Thereafter, fluorothene tubing was extruded on the apparatus and the guider pin heated to a temperature at which a product was obtained having a smooth inner surface. The following tables disclose the approximate temperatures of the various sections of the apparatus, and also contain the melt viscosity of the resins which will serve as a basis for comparison of polymer degradation. The guider pin temperature was found by placing a thermocouple within the passage therethrough.

*Table I*

| | Temperatures, Degrees F. | |
| --- | --- | --- |
| | Older Method Without Guider Heater | Improved Method With Guider Heater |
| Rear Cylinder Section | 480–520 | 440–450 |
| Forward Cylinder Section | 600–650 | 480–520 |
| Crosshead | 600–640 | 480–520 |
| Die | 600–620 | 550–580 |
| Guider Pin | 600–620 | 700–800 |
| Resin (as extruded) | 610–630 | 550–580 |
| Resin Viscosity at 230° C., Megapoises (prior to extrusion) | 15 | 15 |
| Resin Viscosity at 230° C., Megapoises (after extrusion) | 2.0 | 4.0 |

As may be seen from the above illustrative example, that when extruding tubing of fluorothene by the heretofore employed method, the cylinder and crosshead sections are heated to a temperature in the range of 600° F. to 650° F. whereas by employing our method, these same sections are heated to a temperature in the range of 480° F. to 520° F. In addition, our method permits the heating of the die to a lower temperature. Due to the ability of our process to prepare fluorothene tubing, at a much lower temperature, we encounter much less thermal degradation of the polymers and thus are able to obtain a product of improved properties.

A comparison of the resin viscosities found in the above example clearly indicates the superior properties of our tubular product. Moreover, our product was clear in color and free of irregularities, while the tubing prepared by the prior art method was slightly cloudy in color and contained an irregular inner surface, there being gouges thereon.

By the separately controlled additional heating of the guider pin to a temperature at which fluorothene resin will not adhere thereto, we have been able to extrude such resin having an initial melt viscosity of 5 megapoises at 230° C. into tubing where the melt viscosity of the product is 4 megapoises at 230° C. Additionally, we have extruded a fluorothene resin having an initial melt viscosity of 15 megapoises at 230° C. into tubing where the melt viscosity of the product is 10 megapoises at 230° C.

The ability to so extrude fluorothene tubing having such improved melt viscosities clearly establishes that the separately controlled additional heating of the guider pin not only permits the use of lower overall temperatures in the process but also makes possible an improvement in the properties of resin product as less thermal degradation occurs. Furthermore, our invention also insures the production of clear products having smooth inner and outer surfaces.

In general by employing our process it is possible to extrude fluorothene tubing wherein the product will have a melt viscosity of from about 4 megapoises to about 10 megapoises at 230° C. As the fluorothene viscosity of tubing prepared by the heretofore employed methods usually lies in the range of from about 1 to about 2 or 3 megapoises, the improvement is apparent.

Although the invention has been disclosed in its application toward the production of fluorothene tubing, it is to be understood that it is applicable toward the extrusion of all hollow elongated or continuous shapes of fluorothene. Of particular interest is the coating of electrical conductors with fluorothene resins. In normal practice, the conductor to be coated is passed through a longitudinal opening in the guider pin and is thus positioned within the extruded tubular form as it leaves the die.

The application of our invention to the coating field is readily accomplished as the addition of the heating means within the passage of the guider pin will not interfere with the presence of the wire or the coating application. Generally, in such instances, the heating coil will be wrapped about a hollow glass cylinder and inserted within the guider pin. The conductor to be coated will then pass through the hollow glass cylinder and will be subsequently coated.

While in the example disclosed we have shown the guider pin temperature when additionally heated to be approximately 100° F. higher than the die temperature, we do not intend to be limited to such value. Our invention resides in the ability to employ lower overall temperatures in the process of extruding fluorothene tubing and prepare a product of improved properties as less thermal degradation occurs by the independently controlled additional heating of the guider pin.

We claim:

A process for extruding a thermoplastic material comprising a chlorotrifluoroethylene polymer having a melt viscosity from about 5 to 100 megapoises at 230° C. into hollow forms which comprises supplying said material to a chamber, heating said material in said chamber at a temperature below 600° F. to convert said polymer to a plastic state and forcing said heated material through an annular-forming section comprising inner and outer members while maintaining the inner member of said annular-forming section through heating means positioned within said inner member at a temperature above 700° F. and the temperature of the outer member of said annular-forming section below 600° F. whereby said extruded material will have a melt viscosity of from about 4 to 10 megapoises at 230° C.

References Cited in the file of this patent

UNITED STATES PATENTS

| | | |
|---|---|---|
| 2,177,633 | Blackard | Oct. 31, 1939 |
| 2,529,897 | Bailey et al. | Nov. 14, 1950 |
| 2,583,329 | Eckert | Jan. 22, 1952 |
| 2,617,151 | Rubin | Nov. 11, 1952 |
| 2,736,064 | Rubin | Feb. 28, 1956 |

OTHER REFERENCES

Kel-F Technical Bulletin, 1–1–49 and 3–1–49, received by U. S. Patent Office March 6, 1950, M. W. Kellog Co., Jersey City, N. J.